C. E. JONES.
WHIFFLETREE HOOK.
APPLICATION FILED MAR. 14, 1911.
1,021,193.
Patented Mar. 26, 1912.
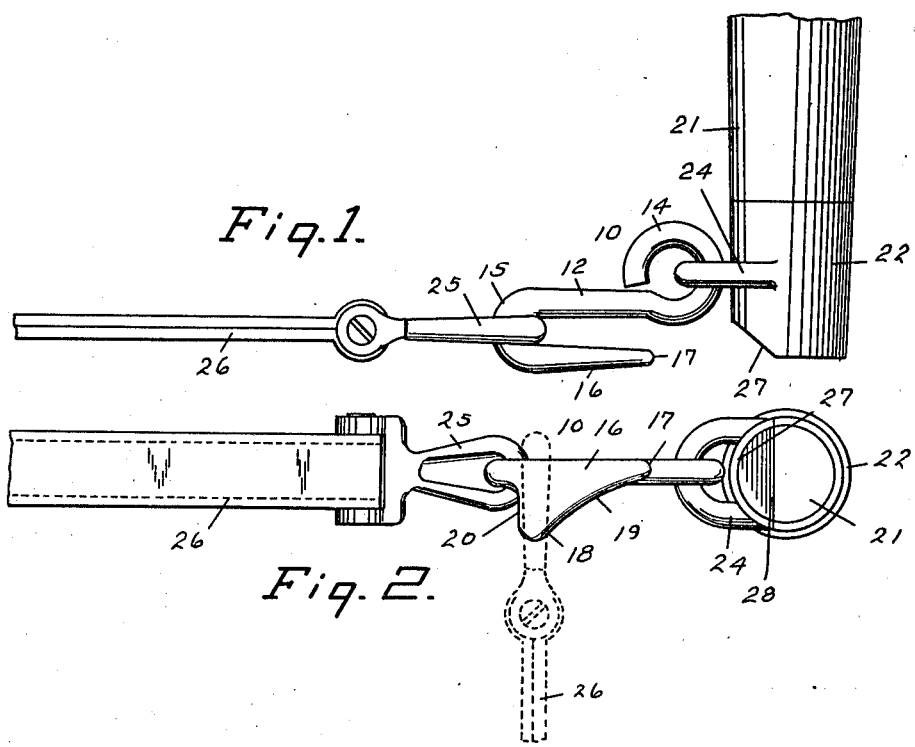
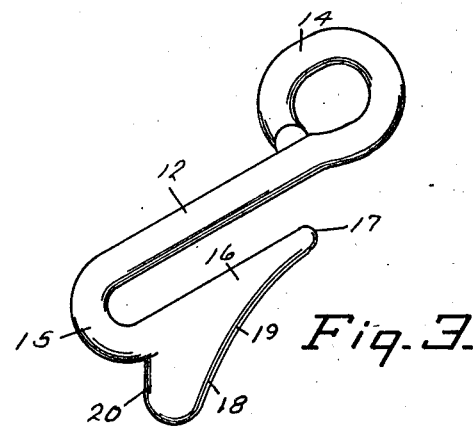
Witnesses
C. L. Brown
H. L. Green
Inventor
Charles E. Jones
By Rich & Manning
Attorneys

UNITED STATES PATENT OFFICE.

CHARLES E. JONES, OF WINDSOR, MISSOURI.

WHIFFLETREE-HOOK.

1,021,193. Specification of Letters Patent. Patented Mar. 26, 1912.

Application filed March 14, 1911. Serial No. 614,464.

*To all whom it may concern:*

Be it known that I, CHARLES E. JONES, a citizen of the United States of America, residing at Windsor, in the county of Henry and State of Missouri, have invented certain new and useful Improvements in Whiffletree-Hooks; and I do hereby declare that the following is a full, clear, and exact description of the invention, such as will enable others to make and use the same, reference being had to the accompanying drawing, forming a part of this specification.

The invention has for its object: First, the coupling of the traces with whiffletree hooks, so that in no position of the whiffletree or hooks can the traces become accidentally detached from the hooks; second, to afford a guard on the hook, which will prevent distorted positions of the hook, when the traces become slackened; and third, a safety hook for preserving its position when engaged with a coupling member.

The invention consists in the novel construction and combination of parts, such as will be first fully described and then specifically pointed out in the claim.

In the drawings: Figure 1. is a plan view of the novel hook, showing also an end portion of the whiffletree, and a portion of a trace of a harness connected with the hook. Fig. 2. is a view looking in the direction of the end of the whiffletree, showing side views of the hook and trace, as seen in Fig. 1. Fig. 3. is a detail view, in perspective, of the hook.

Similar numerals of reference indicate corresponding parts in all the figures of the drawing.

Referring to the drawing, 10 indicates the improved hook, which as shown consists of a straight metal bar, drawn to a sufficient length to form the shank 12, which is circular in cross section, its inner end being bent in the arc of a circle and in the same horizontal plane with the shank, and upon the inner surface of the shank to form an eye 14. The outer end of the shank is bent outwardly in a curved line, to form a neck 15, and its free end then continued parallel with the shank to a point transversely in line with the point of contact of the eye 14, with the shank 12 forming the free end or engaging portion 16, which is also in the same horizontal plane as the eye 14. The sides of the engaging, free end portion 16 are slightly reduced in width from the line of the neck 15, to the extreme portion 17, of said free end portion 16. From the lines of the inner and outer surfaces of the portion 16, of the hook, an extension 18 extends downwardly a considerable distance, to form a guard fin or lug 18, in vertical lines, the rear surface 19 extending upwardly to the free end 17, of said portion 16, of the hook, in a slight inwardly-curved line, and the forward surface 20 extending directly upward to the under side of said portion 16, at a point a slight distance in rear of a line transverse to the inner surface of the neck 15.

In the attachment of the improved hook, as shown to the whiffletree, the end 21 of the whiffletree is provided with a ferrule or thimble 22, upon which is cast or formed an eye 24, and with this eye is attached in the ordinary manner the eye 14, on the shank 12, of the invention, the portion 16 of the hook being outward, it being obvious that the hooks are formed in manufacture in pairs, the portions 16, 18, 19 and 20, being outward relatively to opposite surfaces of the shank 12, for the right and left-hand ends of the whiffletree. A small portion 27, of the outer portion of the thimble 22, on the end of the whiffletree, is cut away obliquely, at an angle to and as an approach to the vertical, outer surface of the eye 24, the corresponding part of the whiffletree beneath said oblique lines of the thimble being also cut away as at 28, in the same inclined plane, the surfaces 28 having a tendency, should the thimble become loosened, to check a rotative movement of the thimble upon the whiffletree.

In the attachment of the cockeye 25, on the inner end of the trace 26, to the hook 10, the position of the inner end of the trace 26 and the cockeye 25 are as seen in dotted lines in Fig. 2, arranged in a vertical position, the larger end of the cockeye being opposite in position to the free end 17, of the portion 16, of the hook, the narrow portion of the opening in the cockeye being lowest in position and opposite the downwardly-extended inwardly curved portion of fin or lug 18, of the hook. In this position of the cockeye it is moved horizontally until it has passed the forward, vertical surface 20, when the cockeye is turned at right angles and engages with the neck 15, the lines of the draft on the trace being from the neck obliquely through the shank 12, through the eye 24. In the engaged position of the cockeye with the neck 15, of the hook, a distorted position of the hook is prevented, the lug or fin 18, which now contacts with the outer surface of the cockeye guiding its movements, while the pull is upon the trace and during the slack in the trace. In the application of the cockeye to the hook the curved surface 19 serves to guide the portion 18, through the cockeye, especially when it is difficult to take up the slack required in the trace. Furthermore, when the cockeye is in the neck 15, accidental disengagement cannot occur, and torsional twist, common with the old forms of hooks, with the cockeye, cannot in my invention take place.

The portion 16, of the free end of the hook, and the portions 18, 19 and 20, forming the lug or fin, are to be so constructed that the lines of said portions in transverse section will conform to and move past the inner lines of the cockeye of the trace.

The attachment of the cockeye is facilitated by the oblique surfaces 27, of the thimble 22, this reduction of the thimble opposite the eye 24 forming a throat or passage for more readily engaging the cockeye with the hook 10.

I am aware that the free ends of whiffletree hooks have been provided with crescent shaped portions also with plates in the form of a shield and with a T shaped head, none of which fulfil the capabilities of my invention, viz. a fin which acts by means of its inwardly curved rear surface to facilitate hooking of the cockeye on the traces and permit of the swing of the cockeye during a slack in the pull on the traces while preserving the cockeye from turning. It is clear that when the slack occurs in the traces that the hook drops into a vertical position, thus permitting a free lateral movement of the cockeye past the straight surface 20 of the hook which also acts to prevent turning of the hook. The value of this feature will be apparent in a sudden takeup of the slack in the traces while the cockeye is swinging laterally in which a locking of the old forms of hooks with the cockeye is inevitable.

Such modifications may be employed as are within the scope of the appended claim.

Having fully described my invention, what I now claim as new and desire to secure by Letters Patent is.

A whiffletree hook having its free end and shank extending horizontally and in parallel planes, a downward extension of said free end of the hook adapted to form a fin, the rear surface of which fin is inwardly curved and its forward surface positioned in rear of the line of the neck of the hook and extended upwardly in a vertical plane.

CHARLES E. JONES.

Witnesses:
ROBERT O. McLIN,
ANNIE L. GREER.

---

Copies of this patent may be obtained for five cents each, by addressing the "Commissioner of Patents, Washington, D. C."